(12) United States Patent
Hiramoto

(10) Patent No.: US 6,896,178 B2
(45) Date of Patent: May 24, 2005

(54) IDENTIFICATION CODE CREATING METHOD IN NETWORK AND IDENTIFICATION CODE CREATING PROGRAM

(75) Inventor: Junya Hiramoto, Meguro-ku (JP)

(73) Assignee: Ainix Corporation, Tokyo (JP)

( * ) Notice: Subject to any disclaimer, the term of this patent is extended or adjusted under 35 U.S.C. 154(b) by 0 days.

(21) Appl. No.: 10/381,215

(22) PCT Filed: Oct. 3, 2001

(86) PCT No.: PCT/JP01/08691

§ 371 (c)(1),
(2), (4) Date: Mar. 28, 2003

(87) PCT Pub. No.: WO02/28655

PCT Pub. Date: Apr. 11, 2002

(65) Prior Publication Data

US 2003/0184797 A1 Oct. 2, 2003

(30) Foreign Application Priority Data

Oct. 5, 2000 (JP) ...................................... 2000-306217

(51) Int. Cl.[7] .............................................. G06F 17/00
(52) U.S. Cl. ............. 235/375; 235/462.01; 235/462.02; 235/462.08; 235/487; 358/1.18
(58) Field of Search ........................... 235/375, 462.01, 235/462.02, 462.08, 462.09, 487; 358/1.18

(56) References Cited

U.S. PATENT DOCUMENTS

| | | | | |
|---|---|---|---|---|
| 5,621,864 A | * | 4/1997 | Benade et al. | 358/1.18 |
| 6,220,509 B1 | * | 4/2001 | Byford | 235/375 |
| 6,525,835 B1 | * | 2/2003 | Gulati | 358/1.18 |

OTHER PUBLICATIONS

Patent Abstracts of Japan No. 11–265419 dated Sep. 28, 1999/Cited in the International Search Report.
Patent Abstracts of Japan No. 2000–066851 dated Mar. 3, 2000/Cited in the International Search Report.
Patent Abstracts of Japan No. 04–216975 dated Aug. 7, 1992/Cited in the International Search Report.

* cited by examiner

*Primary Examiner*—Steven S. Paik
(74) *Attorney, Agent, or Firm*—Armstrong, Kratz, Quintos, Hanson & Brooks, LLP.

(57) ABSTRACT

There are provided an identification code creating method and an identification code creating program capable of excellently printing or displaying an identification code regardless of a resolution of a printer or display screen in creating the identification code of a bar code, a two-dimensional symbol or the like by a server apparatus in accordance with a request and an instruction from a client apparatus connected thereto via a network of an intranet, the internet or the like and printing or displaying the identification code by the printer or the like or the display screen connected to the client apparatus, for example, the identification code is created by the server apparatus based on an identification code creating data transmitted from the client apparatus, a program of drawing the identification code, a program of acquiring the resolution of the printer and the like are provided to the client apparatus along with a parameter file thereof. Or, the server apparatus acquires the resolution of the printer or the display screen connected to the client apparatus, the identification code is created based on the resolution and an image data thereof is provided to the client apparatus.

2 Claims, 10 Drawing Sheets

(a) 
Code128

(b) 
Code39

(a) 
PDF417

(b) 
MicroPDF417

(a) 
DataMatrix (b) 
QR Code (c) 
MaxiCode

IDENTIFICATION CODE CREATING METHOD IN NETWORK AND IDENTIFICATION CODE CREATING PROGRAM

This application is the 35 USC 371 National Stage of International Application No. PCT/JP01/08691, filed Oct. 3, 2001.

TECHNICAL FIELD

The present invention relates to a method for creating an identification code of a bar code, a two-dimensional symbol or the like added to, for example, an order form, a delivery form or the like, particularly, a method for creating an identification code and a program of creating an identification code when the identification code is created via a network by an electronic apparatus of a computer, a portable telephone or the like connected to the network.

BACKGROUND ART

Conventionally, for example, in various commodity dealings or steps of handling various articles and the like, a document, a label, a card, a tag sheet and the like of an order form, a delivery form, a debit note, an invoice, an operation instruction form, an inspection instruction form, a commodity label, an article label, a tag, an ID card, a clinical chart, a prescription and the like of commodities or articles, are added with identification codes of a bar code, a two-dimensional symbol and the like to thereby facilitate handling, control, storage or the like of the documents, the commodities, the articles and the like. Further, in a reservation system of a concert or the like by a portable telephone, reservation and confirmation are made to be able to simplify by encoding and displaying reservation and confirmation data.

As the above-described identification codes, bar codes and two-dimensional symbols are frequently used and FIGS. 9(a) and (b) show an example of a bar code. Further, in the two-dimensional symbols, there are a stack type having a shape of stacking bar codes as shown by FIGS. 10(a) and 10(b) and a matrix type in a shape of aligning stones on a go board as shown by FIGS. 11(a), 11(b) and 11(c).

Further, the above-described identification codes are automatically created by a computer, and in a computer connected to a network of the internet, an intranet or the like, the identification codes are created by utilizing the networks.

For example, in a network system constituted by a data storing server apparatus and a client apparatus, when a document, a label, a card, a tag sheet or the like added with an identification code of a bar code, a two-dimensional symbol or the like is printed by the client apparatus, a software having a function of creating the identification code is installed at inside of the client apparatus, thereby, the identification code is created and displayed by displaying means or the like of CRT, a liquid crystal display or the like or printed by printing means of a printer or the like.

Further, for example, in a network system by the internet or an intranet, a program having a function of creating an identification code is constructed at inside of a server apparatus, image data of the identification code created thereby is downloaded by a client apparatus to display or print.

However, in the system of installing the software having the function of creating the identification code to the client apparatus as in the former system, there is a drawback that expense of the software and time and labor of installing the software are taken for the respective client apparatus and enormous expense and labor are required in maintenance and control thereof.

Meanwhile, when the image data of the identification code created by the server apparatus is downloaded by the client apparatus to display or print as in the latter system, although it is not necessary to install the program for creating the identification code to the client apparatus, when the resolution of displaying or printing means provided or connected to the client apparatus is low, or the resolution of the created image and the resolution of the displaying means, a printer or the like differ from each other, highly accurate printing is difficult to thereby pose a problem of reducing a rate of reading the identification code or binging about erroneous reading.

Particularly, the bar code and the two-dimensional symbol of the stack type are encoded by elements having a plurality of widths and therefore, print accuracy of the element widths effects significant influence on reading. For example, assuming printing means of 300 dpi (0.085 mm/dot), when bar code image data created by a slender element width of 0.25 mm (3 dots) and a bold element width of 0.59 mm (7 dots) is downloaded by the client apparatus and printed by printing means of 360 dpi (0.071 mm/dot), the slender element must be printed by about 3.6 dots and the bold element must be printed by 8.3 dots.

However, printing by a unit of 1 dot or less cannot be carried out and therefore, in actual printing, the printing is carried out by automatically adjusting the slender element such that an average value of the slender element width becomes 3.6 dots by combining 3 dots and 4 dots and automatically adjusting the bold element such that an average value of the bold element width becomes 8.3 dots by combining 7 dots and 8 dots. Therefore, a bar code to be printed as shown by, for example, FIG. 12(a) is printed as shown by FIG. 12(b) and widths of the elements become nonuniform.

Further, according to the bar code, the widths of the elements are compared and converted into numerical values, according to the bar code standard, an element ratio (a width of a bold element as compared with a width of a slender element) needs to be 2.2 times or more, however, when the slender element is constituted by 4 dots and the bold element is constituted by 7 dots as described above, the element ratio becomes about 1.8 times and therefore, a reduction in the reading rate or erroneous reading is brought about.

Further, when, for example, the above-described identification code is displayed by displaying means of a liquid crystal display or the like and the bar code is directly read by an identification code reading apparatus of a bar code reader or the like, the image data is constituted by a data structure by a unit of dots, when the image data is displayed as it is by displaying means, an image having the size governed by the resolution of the displaying means is produced, and in small displaying means as in a portable telephone, an image exceeding the size is produced and all of the image is not displayed.

For example, when a slender element width is constituted by 4 dots by displaying means of 320 dots, 80 elements can be displayed, however, in displaying means of 180 dots, only 45 elements can be displayed. Therefore, in the case of a code which needs 60 elements, all of the elements cannot simultaneously be displayed by the displaying means of 180 dots.

It is an object of the invention to resolve the above-described problem of the conventional technology and to provide a method of creating an identification code and a program of creating an identification code capable of excellently displaying or printing the identification code regardless of a resolution of displaying means or printing means on a side of a client when the identification code is created by utilizing a network.

DISCLOSURE OF THE INVENTION

An identification code creating method and an identification code creating program in a network according to the invention are constituted as follows.

That is, an identification code creating method in a network according to the invention is characterized in that in creating an identification code of a bar code, a two-dimensional symbol or the like by a server apparatus in accordance with a request and an instruction from a client apparatus connected thereto via a network of an intranet, the internet or the like and printing the identification code by printing means of a printer or the like connected to the client apparatus, the identification code is created by an identification code creating program at inside of the server apparatus based on an identification code creating data from the client apparatus, a parameter file of the created identification code is transmitted to the client apparatus, and a drawing module for drawing the identification code as an image data by the parameter file in accordance with a resolution of the printer connected to the client apparatus is supplied to the client apparatus.

The drawing module is characterized in including at least means for acquiring the resolution of the printer connected to the client apparatus and means for drawing the identification code as an image by the parameter file in accordance with the resolution of the printer. Further, the drawing module is transmitted to the client apparatus along with the parameter file. Or, the drawing module may be recorded to a record medium readable by the client apparatus, for example, a floppy disk, CD-ROM or the like to distribute.

Further, an identification code creating method in a network according to the invention is characterized in that in creating an identification code of a bar code, a two-dimensional symbol or the like by a server apparatus in accordance with a request and an instruction from a client apparatus connected thereto via a network of an intranet, the internet or the like and printing the identification code by printing means of a printer or the like connected to the client apparatus, means for acquiring a resolution of the printing means connected to the client apparatus is provided at inside of the server apparatus, the identification code in accordance with the resolution is created by an identification code creating program at inside of the server apparatus based on the resolution of the printing means acquired by the resolution acquiring means and an identification code creating data from the client apparatus, and an image data of the created identification code is supplied to the client apparatus.

Further, an identification code creating method in a network according to the invention is characterized in that in creating an identification code of a bar code, a two-dimensional symbol or the like by a server apparatus in accordance with a request and an instruction from a client apparatus connected thereto via a network of an intranet, the internet or the like and displaying the identification code for directly reading by an identification code reading apparatus of a bar code reader or the like by displaying means provided at the client apparatus, means for acquiring a resolution of the displaying means provided at the client apparatus is provided at inside of the server apparatus, the identification code in accordance with the resolution is created by an identification code creating program at inside of the server apparatus based on the resolution of the displaying means acquired by the resolution acquiring means and an identification code creating data from the client apparatus, and an image data of the created identification code is supplied to the client apparatus.

Further, an identification code creating program according to the invention is characterized in making a computer function as means for creating an identification code based on an identification code creating data from a client apparatus at least by a request and an instruction from the client apparatus, and means for transmitting a parameter file of the created identification code to the client apparatus.

Further, an identification code creating program according to the invention is characterized in making a computer function as means for creating an identification code based on a resolution of printing means connected to the client apparatus and an identification code creating data from a client apparatus and suitable for the resolution at least by a request and an instruction from the client apparatus, means for converting the created identification code into an image data, and means for transmitting the image data to the client apparatus.

Further, an identification code creating program according to the invention is characterized in making a computer function as means for creating an identification code based on a resolution of displaying means provided at a client apparatus and an identification code creating data from the client apparatus and suitable for the resolution at least by a request and an instruction from the client apparatus, means for converting the created identification code into an image data, and means for transmitting the image data to the client apparatus.

BEST MODE FOR CARRYING OUT THE INVENTION

A specific explanation will be given of a method of creating an identification code in a network according to the invention in reference to the drawings as follows.

Figure 1:
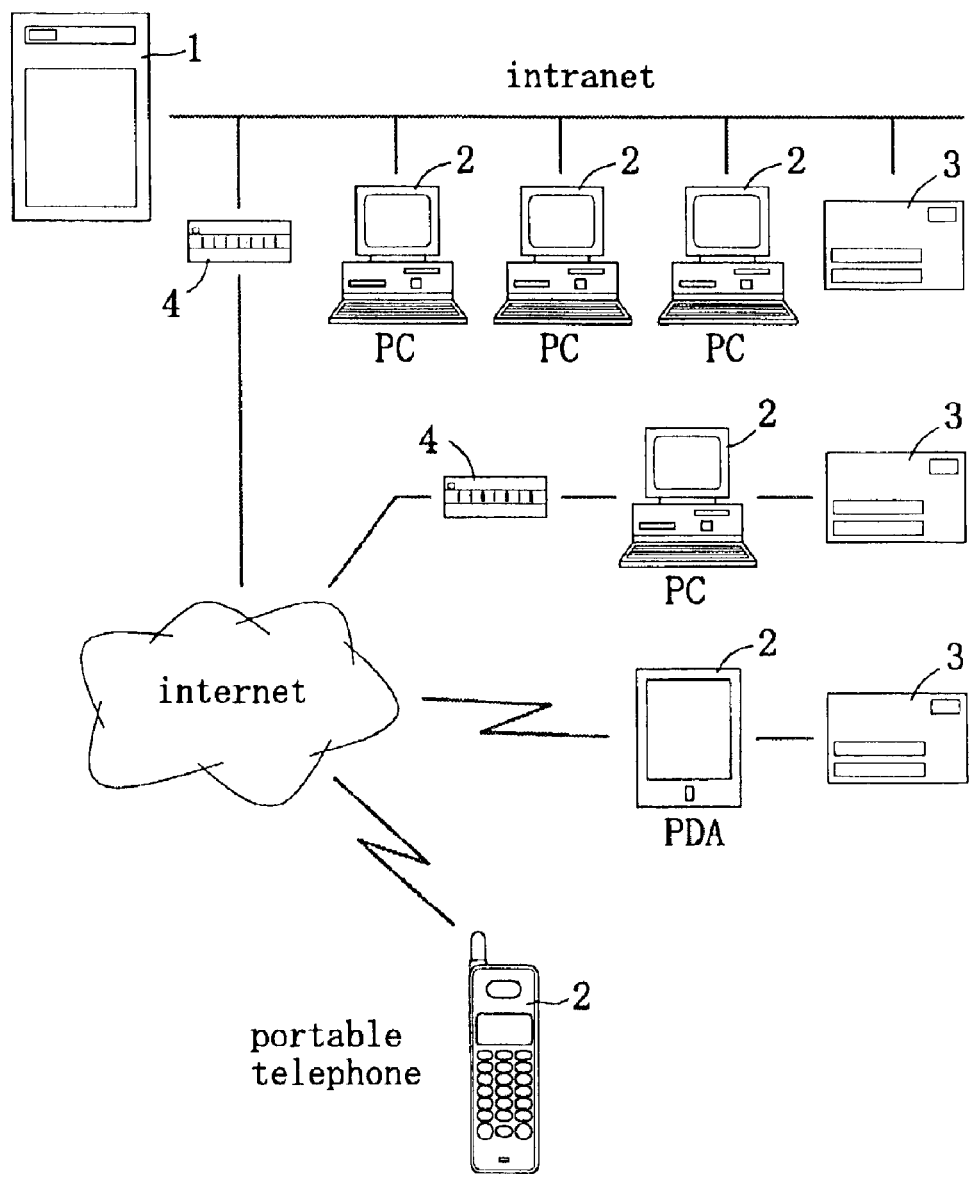
FIG. 1 is an explanatory view showing an example of a constitution of a network.

For example, as shown by FIG. 1 when a server apparatus (application server) 1 installed with an application is connected with a client apparatus 2 of a personal computer, a portable terminal (PDA; Personal Digital Assistant), a portable telephone or the like, for example, via an intranet at inside of an office or the internet at outside of an office or the like, the respective apparatus 2 can make access to the server apparatus 1 via the network, display a web site (home page) and download, register and update necessary data. In the drawing, numeral 3 designates printing means of a printer or the like and numeral 4 designates a communication connecting apparatus of a router, a terminal adaptor or the like.

Figure 2:
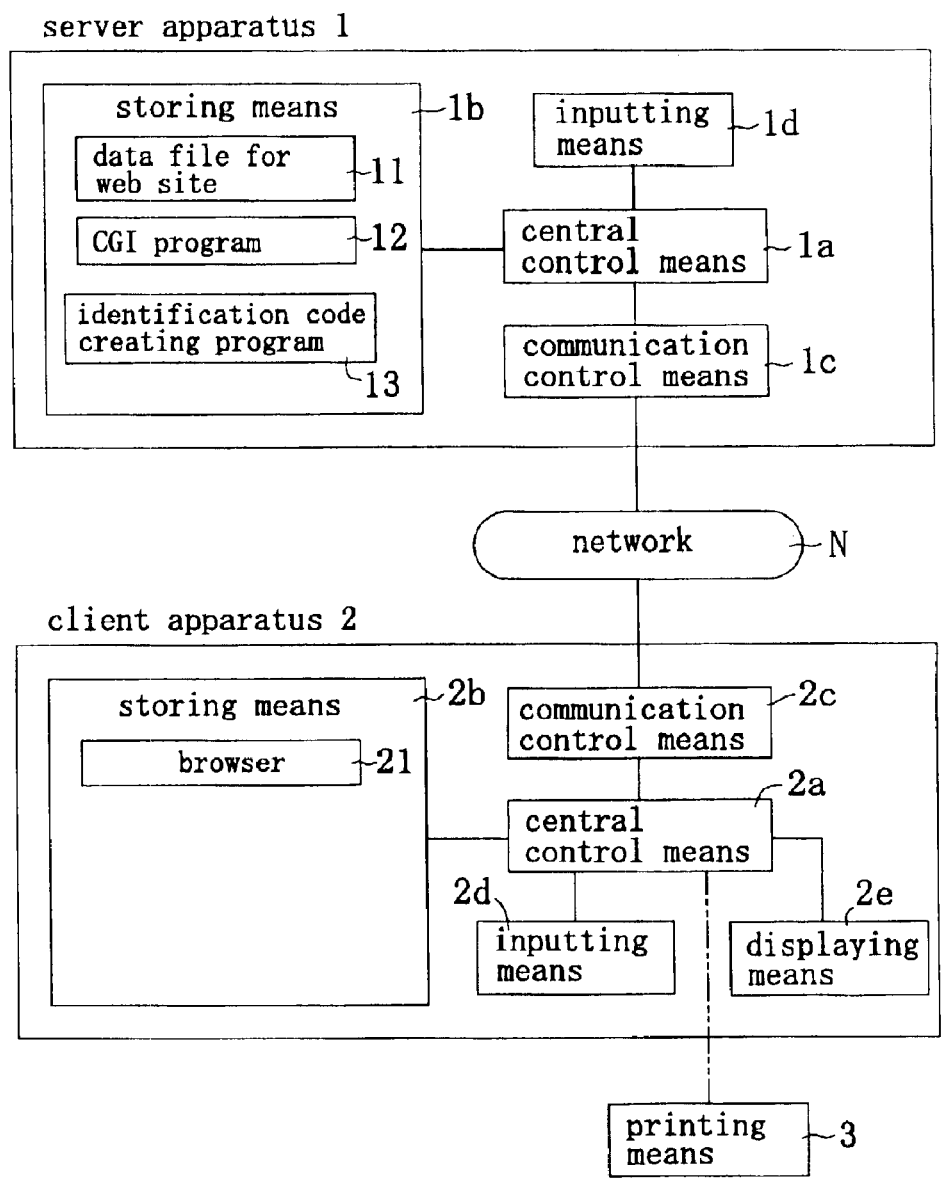
FIG. 2 is an explanatory view showing apparatus constitutions or the like of a server apparatus and a client apparatus.

As shown by FIG. 2, the server apparatus 1 is provided with central control means 1a of CPU or the like, storing means 1b of a hard desk or the like, communication control means 1c, inputting means id of a keyboard, a mouse or the like. The storing means 1a is installed with a data file for a web site 11, an identification code creating program 13 and a CGI (Common Gateway Interface) program 12, a JAVA program or the like for driving the program. Further, the storing means 1a is constituted to be able to hold a conversion data or the like necessary for creating an identification code as a data base as necessary.

The CGI program 12 or the JAVA program starts the identification code creating program 13 by request and instruction from the client apparatus 2 and creates an identification code based on data transmitted from the client apparatus 2.

Meanwhile, as shown by FIG. 2, the respective client apparatus 2 is provided with central control means 2a of CPU or the like, storing means 2b of a hard disk or the like, communication control means 2c, inputting means 2d of a keyboard, a mouse or the like and displaying means 2e of CRT, liquid crystal display or the like. The storing means 2a is installed with a browser 21 of Internet Explorer, Netscape or i-mode (all of which are trade marks) for making access to a web site of the server apparatus 1 and displaying a home page or the like.

As mentioned above, the server apparatus 1 and the respective client apparatus 2 are connected via a network N of an intranet, the internet or the like and can interchange data or the like by the communication control means 1c and 2c provided at the respective apparatus. Further, the client apparatus 2 of a personal computer, a portable terminal or the like is generally connected with the printing means 3 of a printer or the like as mentioned above.

Figure 3:
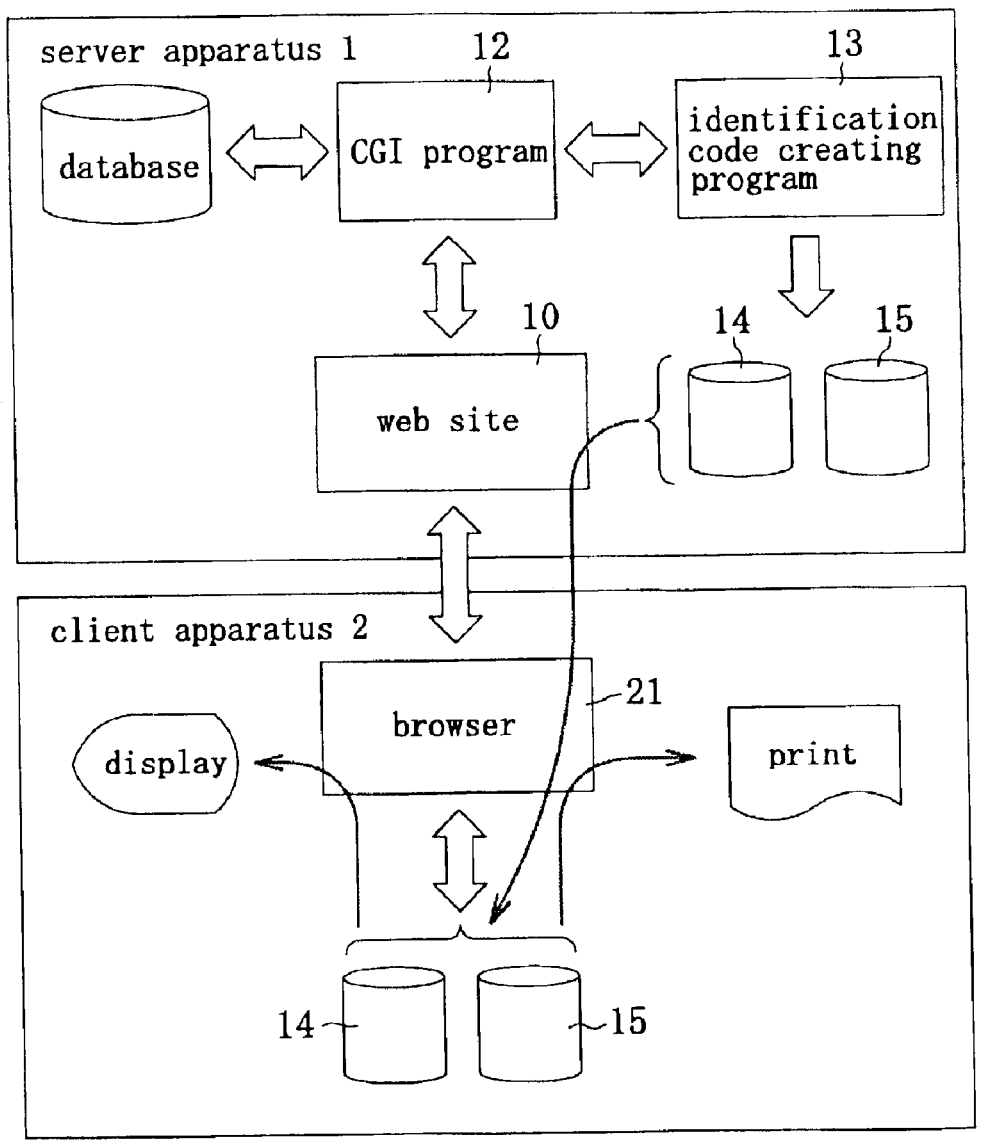
FIG. 3 is an explanatory view showing an example of an identification code creating process according to the invention.
Figure 4:
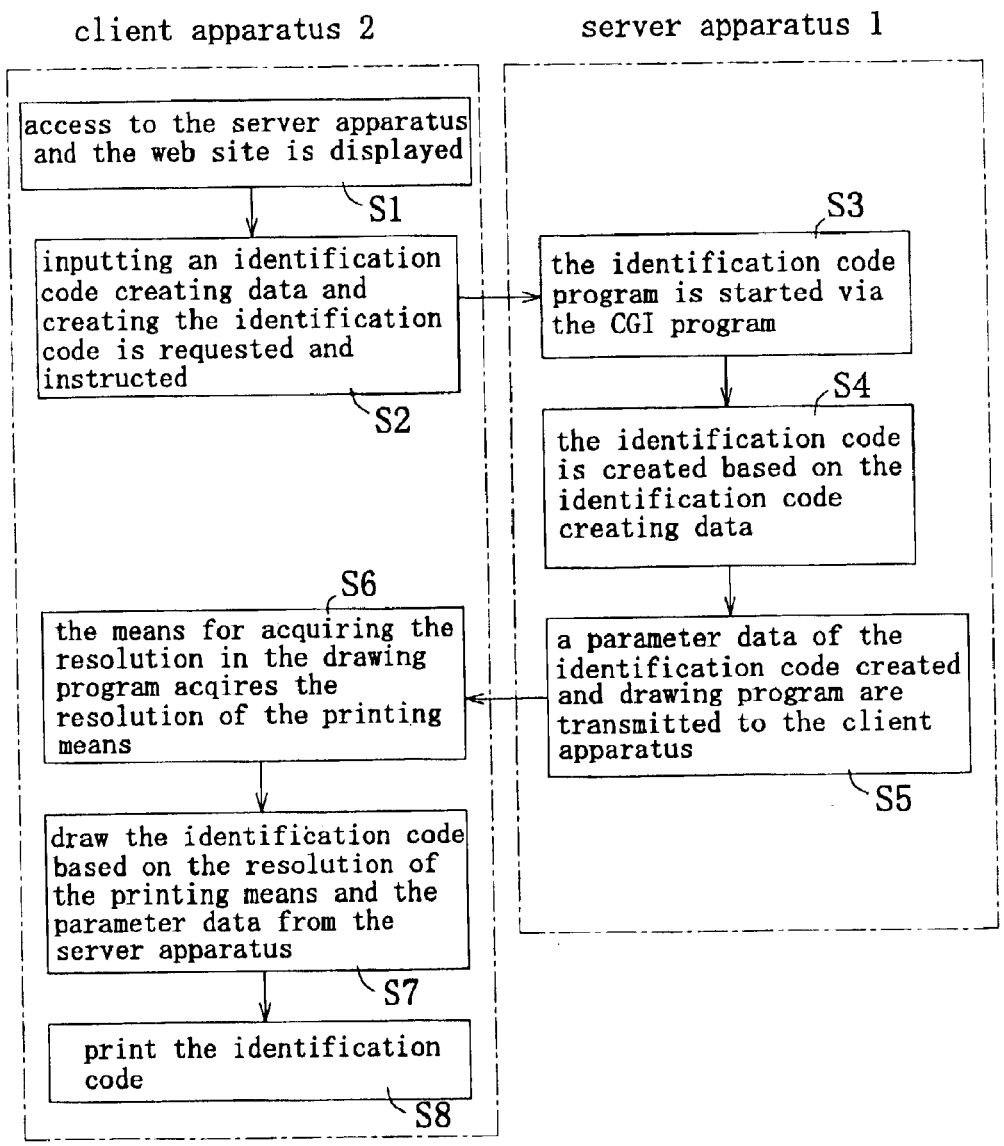
FIG. 4 is a flowchart diagram thereof.

In the above-described constitution, in printing an identification code of a bar code, a two-dimensional symbol or the like by any of the client apparatus 2 of a personal computer, a portable terminal or the like, as shown by FIG. 3 and FIG. 4, first, access is made from the client apparatus 2 to a web site 10 of the server apparatus 1 and a home page or the like of the web site 10 is displayed by the browser 21 in the displaying means 2e (step S1) and the identification code is requested and instructed to create by inputting an identification code creating data, that is, data necessary for creating an identification code to a data input portion (not illustrated) provided on a display screen thereof (step S2).

As the data necessary for creating the identification code, there are (1) kind of identification code (kind of identification code of JAN, Code 39 or the like)

(2) data to be encoded (character row of 123456789 or the like)

(3) dimension of slender element or dimension of module or cell of identification code (4) height of identification code (length of element)

(5) direction of displaying identification code (vertical, horizontal or the like)

(6) resolution data of printing means of printer or the like (7) auxiliary data of kind, dimension or the like of character additionally displayed to identification code and so on, and it is constituted that when (1) kind of code and (2) data to be encoded are inputted at minimum, standard values provided to the identification code creating program are automatically adopted for other data.

Further, the data to be encoded can also be constituted not to directly input numerical value data intended to encode but input data of name, address, product name or the like and create the data to be encoded automatically by the server apparatus 1 in accordance therewith. Specifically, for example, the program is pertinently constituted such that an identification code creating program or the like automatically selects and encodes the data to be encoded from the data of name, address, product name or the like or based on the data, or constituted such that the data to be encoded in correspondence with the data of name, address, product name or the like is held in the storing means 1b or the like and the data to be encoded is automatically selected from the data bank based on the data of name, address, product name or the like transmitted from the client apparatus 2.

When the identification code creating data is inputted as described above, the server apparatus 1 is requested and instructed to create the identification code and although specific instruction operation therefor is pertinently carried out, for example, an input operation finish button (not illustrated) or the like provided at the data input portion or the like is clicked, or a massage or the like for creating the identification code is transmitted. Based thereon, the identification code creating program 13 is started via the CGI program 12 at inside of the server apparatus 1 (step S3).

By starting the identification code creating program 13, operation of creating the identification code is started and the identification code is created based on the kind of the identification code and the data to be encoded and the like transmitted from the client apparatus 2 (step S4). For example, in the case of the bar code of Code 128 of FIG. 9(a), an alignment order or the like of 4 kinds of widths of elements of 1 module to 4 module in correspondence with a character row of the data to be encoded is determined and in the case of the bar code of Code 39 of FIG. 9(b), an alignment order or the like of slender elements and bold elements in correspondence with a character row of the data to be encoded is determined.

Further, the identification code is constituted by basic parameters of kind end of code, element width or module width or cell dimension, height of bar, line pattern, row pattern, number of modules per line, characteristic pattern and the like and auxiliary parameters of range of blank, kind of color, character font, position of printing character and the like and the resolution of the printing means is determined by instruction from the client apparatus or a standard value provided to the identification code creating program.

According to the embodiment, an image data of the identification code created as described above is not transmitted to the client apparatus 2 but a parameter data 14 thereof is transmitted thereto (step S5). Further, at that occasion, a drawing module (drawing program) 15 of Plug-in program, Helper program or the like for drawing the identification code by the parameter data is transmitted to the client apparatus 2 along with the parameter data 14 to enable the client apparatus 2 to draw the identification code.

Further, the drawing module 15 is provided with means for acquiring a resolution of the printing means 3 of a printer or the like connected to the client apparatus 2, for example, a program or the like for making access to a printer driver or the like held in the storing means 2b of the client apparatus 2 and automatically acquiring resolution data present at inside of the driver may be provided at inside of the drawing module 15 or belonged thereto.

By transmitting the drawing module 15 having the means for acquiring the resolution of the printing means of a printer or the like connected to the client apparatus 2 and the parameter data 14 of the identification code to be printed from the server apparatus 1 to the client apparatus 2 as described above, the client apparatus 2 firstly acquires the resolution of the printing means 3 connected thereto (step S6), thereafter draws the identification code by setting the element width, the module width and the like to predetermined widths (step S7) and prints the identification code (step S8), thereby, the identification code suitable for the resolution can be printed.

For example, when the bar code image data created by assuming printing means of 300 dpi as mentioned above, is printed by printing means of, for example, 360 dpi connected to the client apparatus 2, as mentioned above, a width of a slender element becomes about 3.6 dots in calculation and a width of a bold element becomes 8.3 dots and, for example, when a number below the decimal point is rounded, the width of the slender element becomes 4 dots, in contrast thereto, when the width of the bold element is constituted to be a least integer having an element ratio of 2.2 times or more, the width of the bold element becomes 9 dots. When these are printed, an excellent bar code is provided.

Further, although according to the above-described example, the number below the decimal point of the width of the slender element provided in calculation is rounded, the number may be rounded down or rounded up, further, although according to the above-described example, the calculation is carried out by setting the slender element as a reference, the calculation may be carried out by setting the bold element as a reference.

Further, although in the embodiment, as the resolution of the printing means, a predetermined reference value, particularly, in the embodiment, 300 dpi is used as a reference value, for example, the resolution maybe set to be undetermined or as a variable without using a predetermined reference value and when the resolution of the printing means connected to the client apparatus 2 is acquired, widths of elements or the like may automatically be set by constituting a reference value by the resolution data or substituting the resolution data for the variable.

The above-described setting method is not limited to a bar code but made to be similar to that for a two-dimensional symbol and when a number of dots or the like is set to comply with code requirements in accordance with a kind of an identification code or the like, an excellent identification code suitable for printing means used cane provided. Further, thereby, an element width or a module width or a cell dimension of an identification code is made uniform and a highly accurate identification code can be printed.

Further, in the case in which the identification code is drawn and printed by the client apparatus 2 as described above, when the resolution of the printing means of the server apparatus 1 and the resolution of the printing means of the client apparatus 2 differ from each other, printed sizes thereof slightly differ from each other. This is unavoidable for a bar code or a two-dimensional symbol under a condition that widths of elements are uniform and is a point which significantly differs from a simple image. However, even when the printed size slightly differs as mentioned above, in the case in which the element width, the module width or the cell dimension is uniform and the element ratio or the like satisfies a predetermined requirement, the identification code can excellently be decoded.

Although according to the embodiment, the drawing module 15 having the means for acquiring the resolution of the printing means connected to the client apparatus is supplied from the server apparatus 1 to the client apparatus 2 along with the parameter data 14, the drawing module 15 having the resolution acquiring means or resolution acquiring means constituted as a program or the like separately from the drawing module 15, may be downloaded from the server apparatus 1 to the client apparatus 2 separately from the parameter data, or distributed by a floppy disk, CD-ROM or the like to install to the client apparatus 2.

Further, although according to the embodiment, the resolution of the printing means connected to the client apparatus is acquired by a side of the client apparatus 2, the resolution may be acquired by a side of the server apparatus. For example, resolution data, for example, a dpi value or the like is made to be able to input by providing an input portion for inputting the resolution of the printing means connected to the client apparatus 2 at inside or a vicinity of a data input portion provided at a web site of the server apparatus 1 represented by the browser 21 of the client apparatus 2. Or, it may be constituted that a kind name of the printing means is inputted, resolution data of each kind in correspondence with the kind name may be held at the storing means 1b or the like of the server apparatus 1 as a data base and the identification code creating program or the like may acquire the resolution from the data base based on the kind name inputted from the client apparatus.

Further, for example, a program or the like for making access from a side of the server apparatus to a printer driver installed at inside of a hard disk or the like of the client apparatus 2 and automatically acquiring resolution data present at inside of the driver, may be provided in the identification code creating program 13, the CGI program 12, or the JAVA program or the like or belonged thereto.

Figure 5:
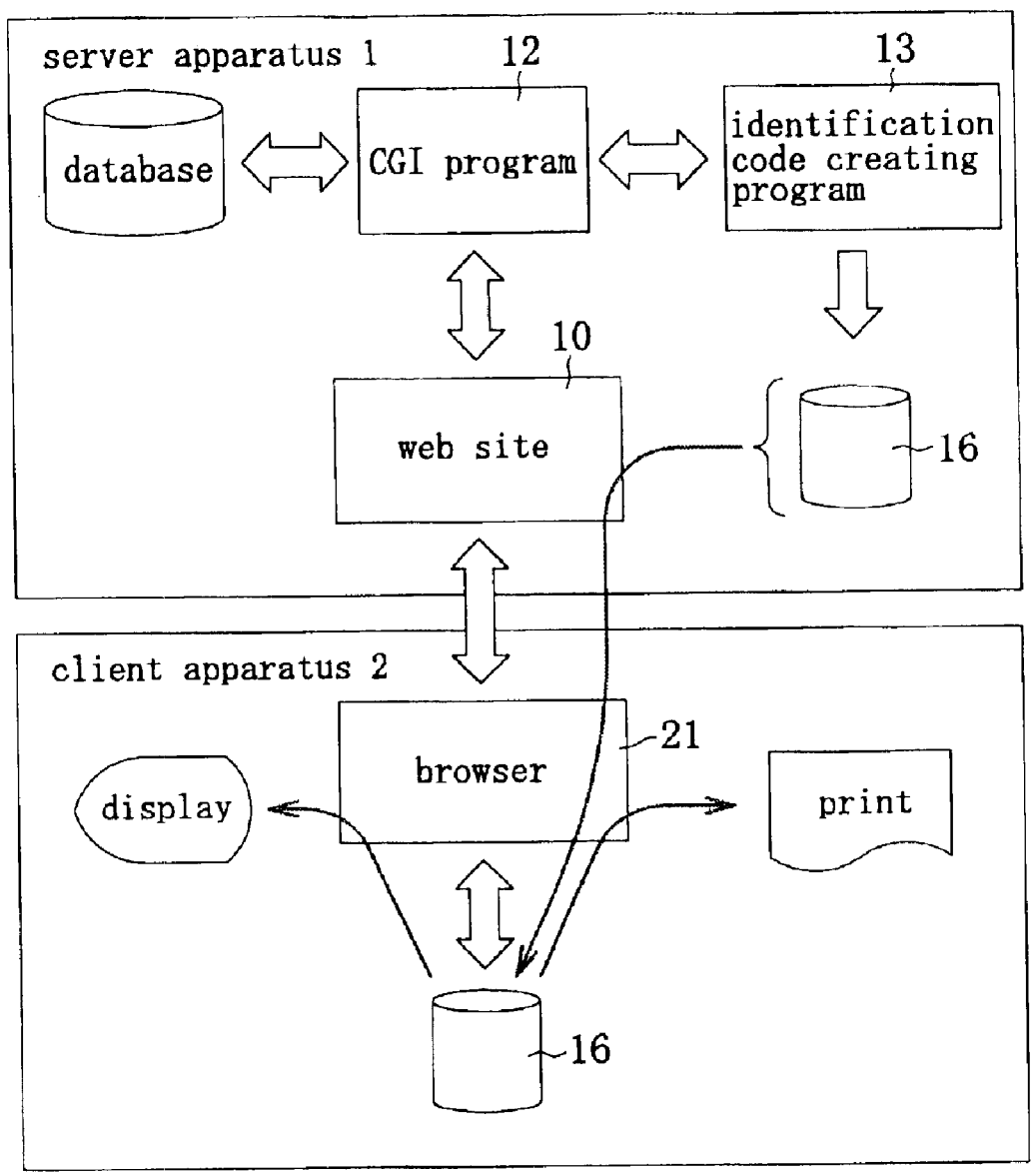
FIG. 5 is an explanatory view showing other example of an identification code creating process according to the invention.
Figure 6:
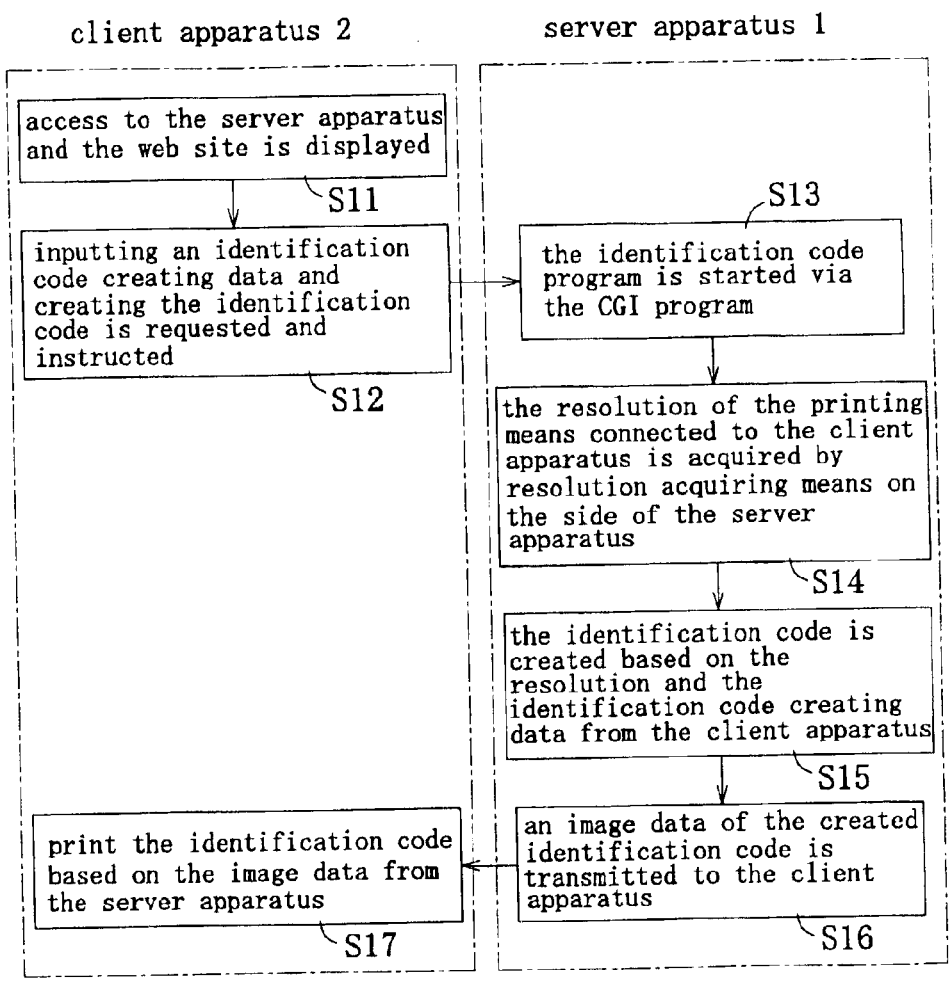
FIG. 6 is a flowchart diagram thereof.

FIG. 5 is an explanatory view showing an example of an identification code creating process-when means for acquiring the resolution of the printing means connected to the client apparatus 2 is provided on the side of the server apparatus and FIG. 6 is a flowchart diagram thereof.

Steps 11 through 13 in FIG. 6 are similar to the steps of FIG. 4 and when the identification code creating program 13 is started at step 13, the resolution of the printing means connected to the client apparatus 2 is acquired by resolution acquiring means provided on the side of the server apparatus, for example, a resolution acquiring program or the like provided in the identification code creating program 13 (step 14). Successively, an identification code suitable for the resolution is created based on the resolution, a kind of the identification code transmitted from the client apparatus, the data to be encoded or the like (step 15) and an image data 16 of the created identification code is transmitted to the client apparatus 2 (step 16).

Meanwhile, the client apparatus 2 displays the image data 16 by a browser or the like and prints the image data 16 by the printing means 3 connected to the client apparatus (step 17). Thereby, the identification code suitable for the resolution of the printing means connected to the client apparatus 2 can easily be provided, it is not necessary to transmit or install a drawing module to the client apparatus 2 as in the above-described embodiment and operation on the side of the client apparatus 2 can significantly be simplified.

Further, the above-described client apparatus 2 of a personal computer, a portable terminal or the like is provided with displaying means of CRT, a liquid crystal display or the like and the identification code can be displayed by the displaying means. In this case, the identification code may be adjusted by a way similar to the above-described in accordance with a resolution of the displaying means as necessary. Particularly, when an identification code displayed by displaying means of the client apparatus 2 of a portable telephone or the like is directly read by an identification code reading apparatus of a bar code reader or the like, it is preferable to adjust an element width or the like of the identification code in accordance with the resolution of the displaying means. Above all, displaying means of a liquid crystal display or the like used in a portable telephone is small-sized and is provided with a small number of dots, when the display is carried out by a number of the dots for ordinary printing, there is a case in which a single identification code cannot be displayed by a single screen as mentioned above and in that case, the element width or the like of the identification code may be adjusted in accordance with the resolution of the displaying means.

The resolution of the displaying means may be acquired by a way similar to that in acquiring the resolution of the printing means, for example, similar to the above-described embodiment, the data input portion provided at the web site of the server apparatus 1 displayed by the browser 21 of the client apparatus 2 is inputted with data for creating the identification code and an input portion for inputting the resolution of the displaying means of the client apparatus 2 is provided at inside or a vicinity of the data input portion to be able to input resolution data of a dpi value or the like. Or, it may be constituted to input the kind name of the displaying means, resolution data or the like of each kind may be held at the storing means 1b or the like of the server apparatus 1 as a data base in correspondence with the kind name and the identification code creating program or the like may acquire the resolution from the data base based on the kind name inputted from the client apparatus. Further, for example, resolution acquiring means of a program or the like for making access from the side of the server apparatus to a display driver of the client apparatus 2 and automatically acquiring the resolution data present at inside of the driver, may be provided in the identification code creating program 13, the CGI program 12 or other program or the like or belonged thereto.

Figure 7:
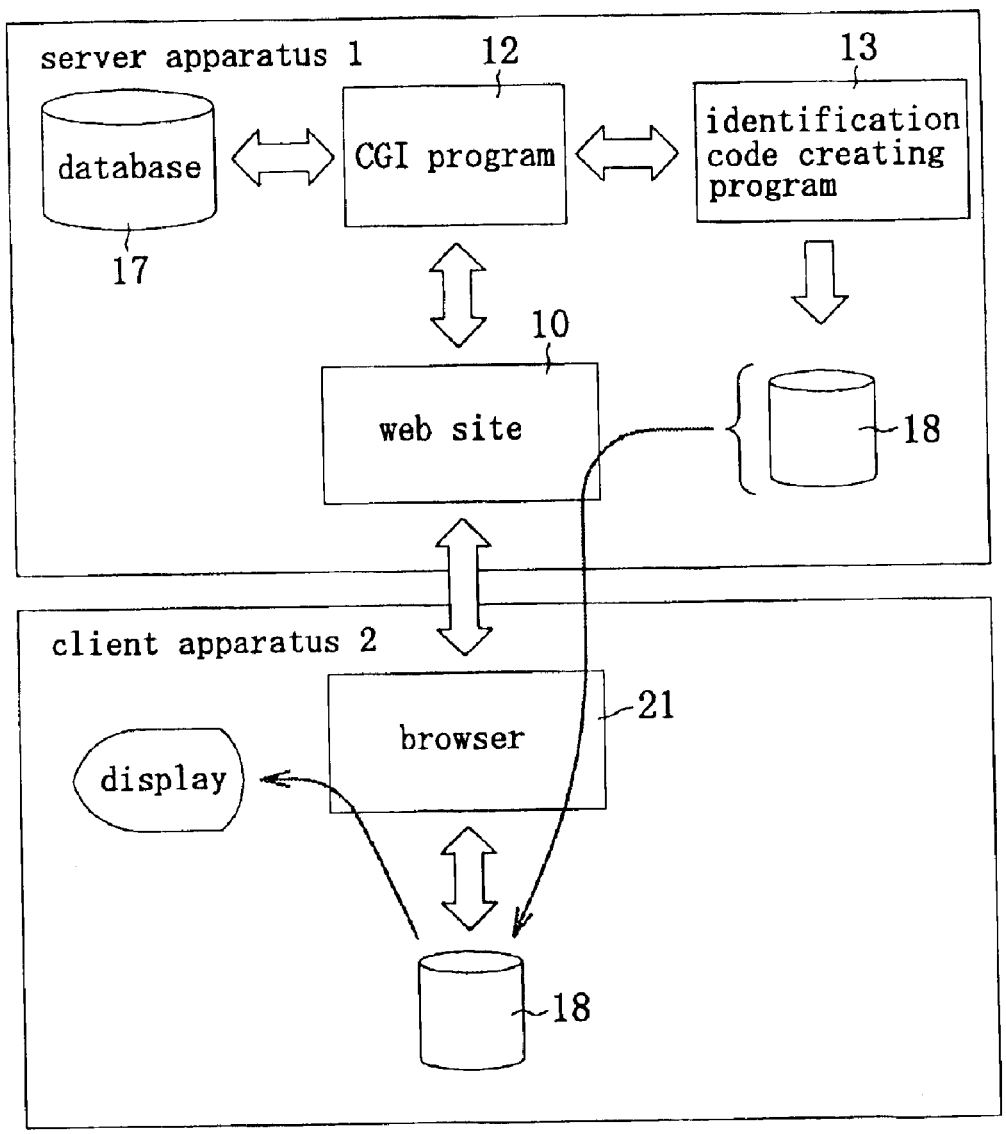
FIG. 7 is an explanatory view showing still other example of an identification code creating process according to the invention.
Figure 8:
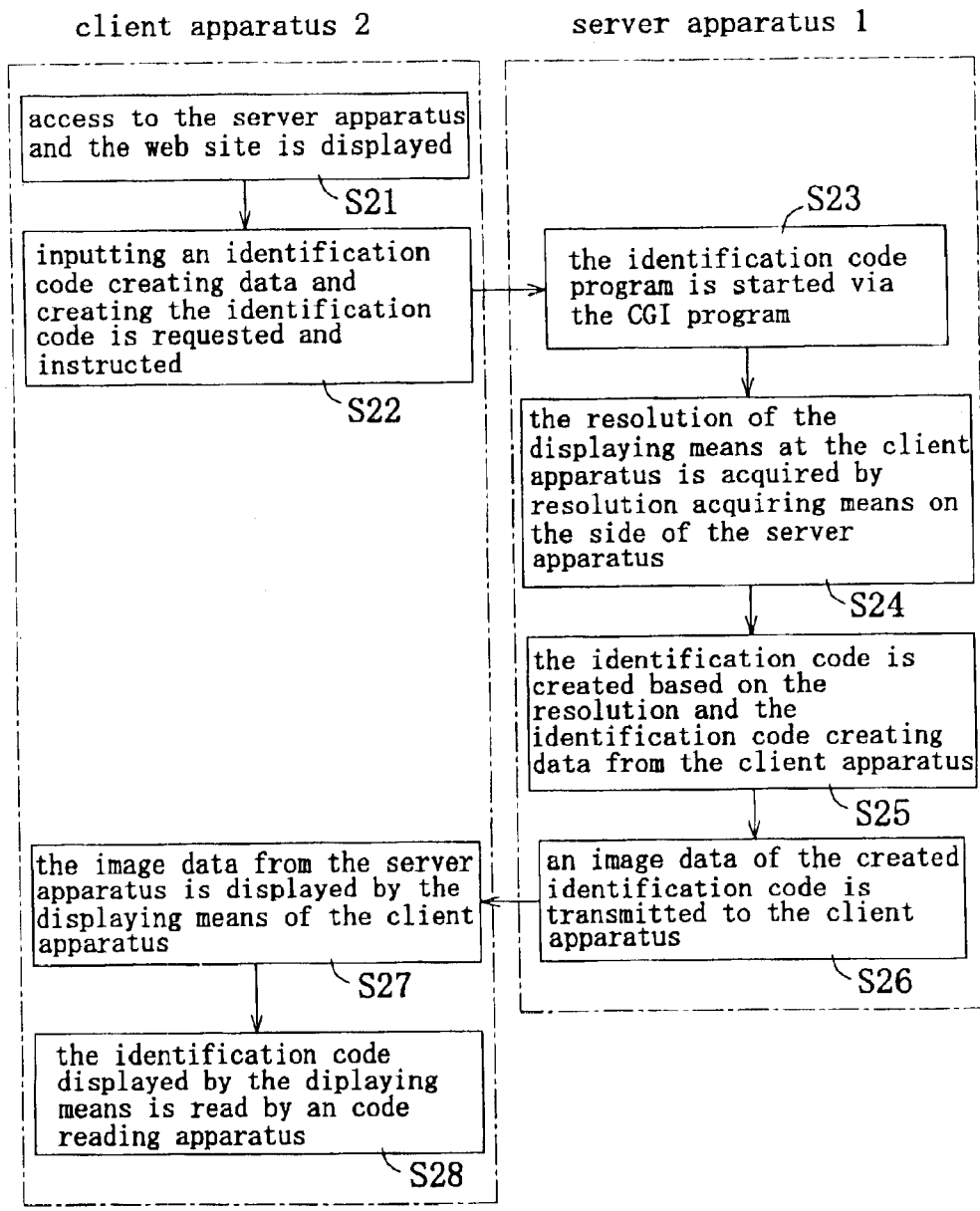
FIG. 8 is a flowchart diagram thereof.

FIG. 7 is an explanatory view showing an example of a process of acquiring a resolution of displaying means of a liquid crystal or the like provided at the client apparatus 2 of a portable telephone or the like by resolution acquiring means on a side of the server apparatus and creating an identification code in accordance with the resolution and FIG. 8 is a flowchart diagram thereof.

First, similar to the above-described embodiment, a web site is displayed by making access from the client apparatus 2 to the server apparatus 1 (step S21), and an identification code creating data is inputted to the data input portion at inside of the web site to request and instruct to create an identification code (step S22). Then, the identification code creating program 13 is started via the CGI program 12 at inside of the server apparatus 1 (step S23), and a resolution of displaying means of a liquid crystal display or the like provided at the client apparatus 2 is acquired by resolution acquiring means provided on the side of the server apparatus, for example, a resolution acquiring program or the like provided in the identification code creating program 13 (step S24).

Figure 9:
FIGS. 9(a) and 9(b) are explanatory diagrams showing an example of a bar code.
Figure 9:

Successively, an identification code suitable for the resolution is created based on the resolution, the kind of the identification code, the data to be encoded or the like transmitted from the client apparatus (step 25). For example, when the bar code of Code 39 of FIG. 9(b) is created, in the case of displaying means having a small size, that is, displaying means having a small number of dots, for example, a width of a slender segment is set to be 2 dots or sets to be 3 dots or more when there is an allowance in the number of dots. Further, a width of a bold segment may pertinently be set to satisfy a predetermined code requirement such that a number of dots of a least integer which is 2.2 times or more of the slender segment is constituted to create the identification code.

Next, when an image data 18 of the identification code created as described above is transmitted to the client apparatus 2 (step 26) and the image data 16 is displayed by the displaying means of the client apparatus 2 by a browser or the like (step S27), the identification code suitable for the displaying means can excellently be displayed. Further, when the identification code displayed by the displaying means is read by an identification code reading apparatus of a bar code reader or the like (step S28), the identification code can be read excellently.

INDUSTRIAL APPLICABILITY

The identification code creating method and the identification code creating program according to the invention are constituted as described above and therefore, the following effects are achieved.

1) An identification code of a bar code or a two-dimensional symbol or the like can be created by the application server apparatus 1 in a network of the internet, an intranet or the like by a request from the client apparatus 2.

2) Only a parameter file of the identification code created by the application server apparatus 1 is transmitted to the client apparatus 2 and therefore, the communication can be carried out by a time period shorter than in transmitting all of created data.

3) The client apparatus 2 can print the identification code by the drawing module of the identification code distributed beforehand.

4) The identification code in correspondence with a dot pitch is drawn by automatically acquiring resolution data of the printer 3 connected to the client apparatus 2 and therefore, can be printed with high accuracy.

Therefore, for example, when order information is summerizingly held at the server apparatus 1 in dealing commodities, the order information accumulated in the server apparatus 1 is downloaded by logging in from the client apparatus 2 to the server apparatus 1 and a delivery sheet and an article slip are issued by the client apparatus 2, a bar code of a product number, an order number or the like is frequently printed on the delivery sheet and the article slip. Although the bar code is used for confirming delivery of a product or inventory control thereof at a destination of delivery, when the bar code is not correctly read, the bar code is inputted by a keyboard and therefore, an operation of efficiency is significantly deteriorated. Therefore, it is extremely important to print a bar code which can be read firmly, according to the invention, the identification code of the bar code or the like can excellently be printed as described above and therefore, reading accuracy can be promoted.

Further, since a structure of the bar code is simple, when widths of elements are set to be large, even when printing accuracy is poor, a high reading rate to some degree can be achieved, however, much information cannot be encoded because the bar code size is increased. In this respect, according to the invention, even when widths of elements are not enlarged, a bar code having excellent accuracy and a high reading rate can be provided. Further, in the case of a bar code having four kinds of element widths as in, for example, JAN code (not illustrated) or Code 128 shown in FIG. 9(a), printing accuracy higher than that of a bar code having two kinds of element widths as in Code 39 shown in FIG. 9(b) is requested, however, in such an identification code, high printing accuracy is achieved according to the invention.

Figure 10:
FIGS. 10(a) and 10(b) are explanatory views showing an example of a stack type two-dimensional symbol.
Figure 10:
Figure 11:
FIGS. 11(a), 11(b) and 11(c) are explanatory views showing an example of a matrix type two-dimensional symbol.
Figure 11:
Figure 11:
Figure 12:
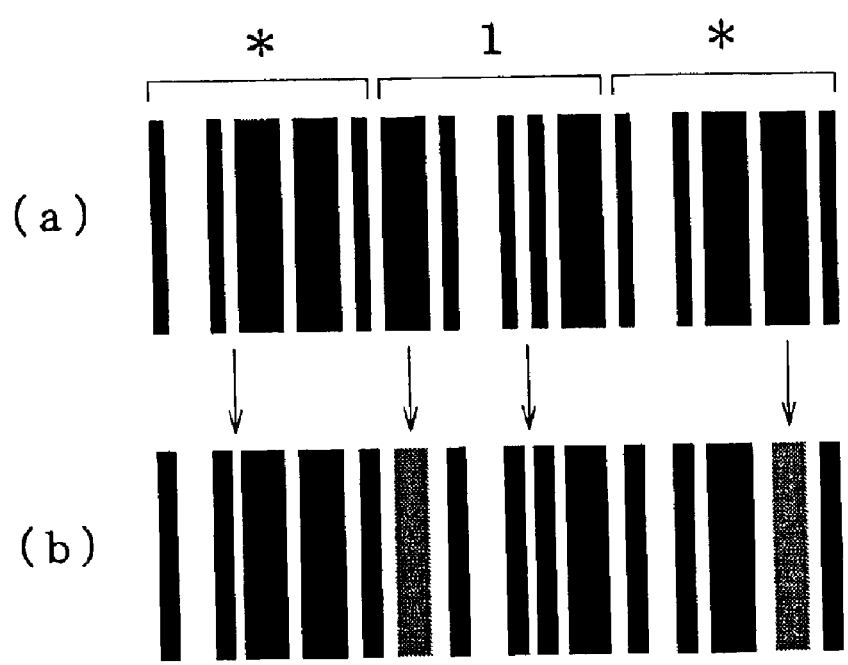
FIG. 12 is an explanatory view showing a print shift of an identification code.

Further, for example, the international standard transport label ISO15394 adopts a bar code and a two-dimensional symbol for a label. The bar code is used in a continuous freight number referred to as license plate and uses Code 39 or Code 128 as shown by FIG. 9(a) or 9(b). As a two-dimensional symbol, MaxiCode shown in FIG. 11(c) is used for assortment pursuit and PDF 417 shown in FIG. 10(a) is used for EDI (electronic data interchange). As assortment pursuit information, other than country code, postal number, and service code, addresses and names of a freight sender and a freight receiver are encoded to constitute about 100 characters. As EDI information, data of format identification number, names and addresses of a freight sender and a freight receiver, delivery number, license plate, order number, amount, product number, lot number, carton number, weight and the like are encoded to constitute several hundreds characters or more.

In this way, the two-dimensional symbol encodes much information and therefore, an information density is frequently increased by reducing the element width or the bar height. In this case, although printing accuracy higher than that of the bar code is required, according to the invention, high printing accuracy is achieved even for the two-dimensional symbol.

Further, as described above, there are the stack type and the matrix type in the two-dimensional symbol, the bar height of the stack type two-dimensional symbol as in PDF417 or MicroPDF417 shown in FIG. 4 is only twice to thrice as small as the element width and therefore, printing accuracy higher than that of the bar code is requested. Meanwhile, the matrix type two-dimensional symbol as in DataMatrix or QRCode shown by FIG. 11(a) or (b) is of a system of encoding by a pattern of a cell arranged at an intersection of a matrix of a square area and characterized in being capable of realizing an information density higher than that of the stack type. The cell size is smaller than the element size of the stack type and therefore, higher printing accuracy is requested. According to the embodiment, high printing accuracy is achieved in both of the two-dimensional symbols.

Further, for example, in a seat reservation system for airplane or the like, the seat can freely be reserved via the internet and the reservation number is given, and it is necessary for a reserver to write down the number and input the reservation number to a ticket issuing terminal at an airport or the like, however, when the system of the invention is used, regardless of a resolution of printing means of a printer or the like connected to a client apparatus, an accurate identification code can be printed and can swiftly be processed by reading the identification code by the ticket issuing terminal.

Further, for example, in reserving a ticket of a concert or the like, after transmitting necessary data by connecting from the client apparatus 2 of a portable telephone or the like to the server apparatus 1, when the server apparatus 1 creates an identification code encoding reservation confirming data or the like from the data and transmits the identification code to the client apparatus and the client apparatus displays the identification code and reads the identification code by an identification code reading apparatus at a concert hall or the like, reservation can easily be confirmed. At this occasion, when the identification code is not correctly read, reservation cannot be confirmed and therefore, time and labor is taken in confirming operation and operational efficiency is significantly deteriorated. Therefore, it is extremely important to display a readable identification code and according to the invention, an excellent identification code can be displayed regardless of the resolution of the displaying means of the client apparatus and therefore, the reading accuracy can be promoted.

What is claimed is:

1. A method of creating an identification code in a network characterized in that in creating an identification code by a server apparatus in accordance with a request and an instruction from a client apparatus connected thereto via a network and printing the identification code by a printer connected to the client apparatus, the identification code is created by an identification code creating program at inside of the server apparatus based on an identification code creating data from the client apparatus, a parameter file of the created identification code is transmitted to the client apparatus, and a drawing module program for drawing the identification code as an image data by the parameter file in accordance with a resolution of the printer connected to the client apparatus is supplied to the client apparatus, wherein the drawing module program is transmitted to the client apparatus separately from the parameter file.

2. A method of creating an identification code in a network characterized in that in creating an identification code by a server apparatus in accordance with a request and an instruction from a client apparatus connected thereto via a network and displaying the identification code by a display screen of the client apparatus, the identification code is created by an identification code creating program at inside of the server apparatus based on an identification code creating data from the client apparatus, a parameter file of the created identification code is transmitted to the client apparatus, and a drawing module program for drawing the identification code as an image data by the parameter file in accordance with a resolution of the display screen of the client apparatus is supplied to the client apparatus, wherein the drawing module program is transmitted to the client apparatus separately from the parameter file.

* * * * *